(12) United States Patent
Ganju et al.

(10) Patent No.: US 12,440,478 B2
(45) Date of Patent: Oct. 14, 2025

(54) PROCESS FOR PREPARING A POTENT THIAZOLE COMPOUND, PHARMACEUTICAL FORMULATION AND USES THEREOF

(71) Applicant: AHAMMUNE BIOSCIENCES PRIVATE LIMITED, Pune (IN)

(72) Inventors: Parul Ganju, Pune (IN); Sudhanand Prasad, Pune (IN); Mahesh Kumar Verma, Pune (IN); Kashinath Komirishetty, Pune (IN); Annie Richharia, Pune (IN)

(73) Assignee: AHAMMUNE BIOSCIENCES PRIVATE LIMITED, Pune (IN)

( * ) Notice: Subject to any disclaimer, the term of this patent is extended or adjusted under 35 U.S.C. 154(b) by 1257 days.

(21) Appl. No.: 17/050,431

(22) PCT Filed: Apr. 26, 2019

(86) PCT No.: PCT/IB2019/053459
§ 371 (c)(1),
(2) Date: Oct. 24, 2020

(87) PCT Pub. No.: WO2019/207548
PCT Pub. Date: Oct. 31, 2019

(65) Prior Publication Data
US 2021/0275502 A1   Sep. 9, 2021

(30) Foreign Application Priority Data

Apr. 27, 2018   (IN) .............................. 201821015990

(51) Int. Cl.
| | |
|---|---|
| A61K 31/426 | (2006.01) |
| A61K 9/06 | (2006.01) |
| A61K 47/10 | (2017.01) |
| A61K 47/32 | (2006.01) |
| A61P 17/00 | (2006.01) |
| A61P 29/00 | (2006.01) |
| C07D 277/28 | (2006.01) |

(52) U.S. Cl.
CPC .............. *A61K 31/426* (2013.01); *A61K 9/06* (2013.01); *A61K 47/10* (2013.01); *A61K 47/32* (2013.01); *A61P 17/00* (2018.01); *A61P 29/00* (2018.01); *C07D 277/28* (2013.01)

(58) Field of Classification Search
None
See application file for complete search history.

(56) References Cited

U.S. PATENT DOCUMENTS 3,749,787 A   7/1973  Hepworth et al.

FOREIGN PATENT DOCUMENTS

WO   WO/2015/172196 A1   11/2015

OTHER PUBLICATIONS

Fu et al. "Phenotypic assays identify azoramide as a small-molecule modulator of the unfolded protein response with antidiabetic activity," Sci. Transl. Med. 7 (292), Jun. 17, 2015. (Year: 2015).*
Fu et al. "Phenotypic assays identify azoramide as a small-molecule modulator of the unfolded protein response with antidiabetic activity," Science Translational Medicine 7 (292), Jun. 17, 2015 (Year: 2015).*
Xie et al. "Vitiligo: How do oxidative stress-induced autoantigens trigger autoimmunity?" Journal of Dermatological Science 81 (2016 ) 3-9; (Year: 2016).*
Verma et al. "Formulation and Evaluation of Clobetasol Propionate Gel," Asian J Pharm Clin Res, vol. 6 Suppl 5, 2013, 15-18. (Year: 2013).*
Fu Suneng et al: "Phenotypic assays identify azoramide as a small-molecule modulator of the unfolded protein response with antidiabetic activity Supplementary Materials", Science Translational Medicine, val. 7, No. 292, Jun. 17, 2015, pp. 292ra98-292ra98, XP055844068.
Suneng Fu et al: "Phenotypic assays identify azoramide as a small-molecule modulator of the unfolded protein response with antidiabetic activity", Science Translational Medicine, val. 7, No. 292, Jun. 17, 2015, pp. 292ra98-292ra98, XP055557634.
Niazi: "Handbook of Pharmaceutical Manufacturing Formulations Semisolid Products vol. 4", Jan. 1, 2004, XP055238511.
Prashiela Manga et al: "Recent advances in understanding vitiligo", F1000RESEARCH, val. 5, Jan. 1, 2016, p. 2234, XP055536120.
Suneng Fu et al: "Phenotypic assays identify a small molecule modulator of the unfolded protein response with anti-diabetic activity", Science Translational Medicine, val. 7, No. 292, Jun. 17, 2015, pp. 292ra98-292ra98, XP055603128.
European Search Opinion and Search Report mailed on Feb. 7, 2022, in European Application No. 19793762.

(Continued)

*Primary Examiner* — Jeffrey S Lundgren
*Assistant Examiner* — Michael J Schmitt
(74) *Attorney, Agent, or Firm* — Trupti P. Joshi

(57) ABSTRACT

The present invention relates to a process for preparing N-[2-[2-(4-chlorophenyl)-4-thiazolyl]ethyl]-butanamide. The present invention further relates to a pharmaceutical formulation and the use of said pharmaceutical formulation consisting of N-[2-[2-(4-chlorophenyl)-4-thiazolyl]ethyl]-butanamide or pharmaceutically acceptable salts thereof as active compound for the treatment and prevention of autoimmune diseases and diseases involving skin immunology, skin autoimmune diseases and pigmentation disorders.

14 Claims, 3 Drawing Sheets

(56) References Cited

OTHER PUBLICATIONS

Figure 1:
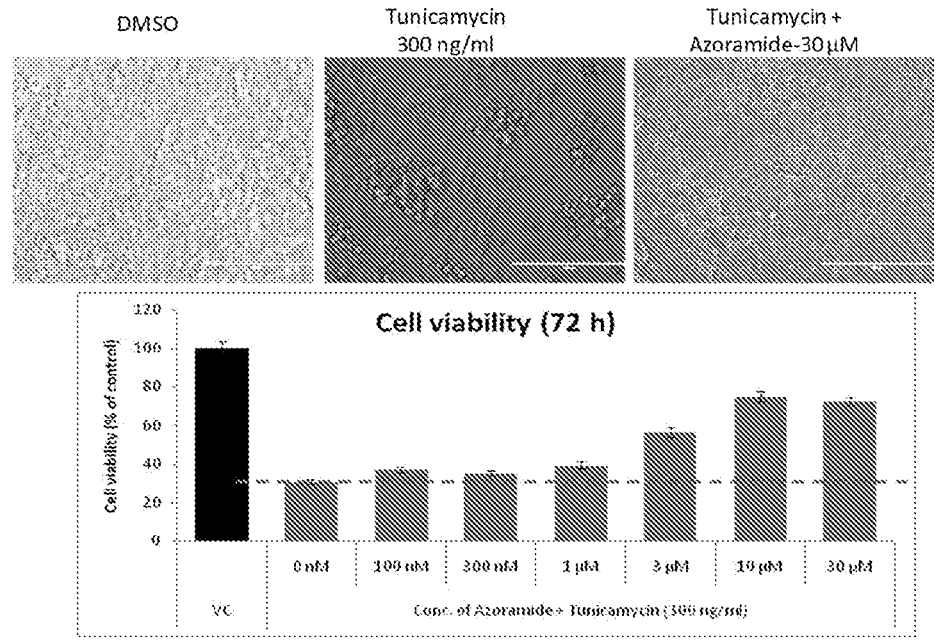

International Search Report mailed on Aug. 23, 2019, in the PCT Application No. PCT/IB2019/053459.
Written Opinion mailed on Aug. 23, 2019, in the PCT Application No. PCT/IB2019/053459.
Fu, S., Yalcin, A., Lee, G. Y., Li, P., Fan, J., Arruda, A. P., Hotamisligil, G. S. (2015). Phenotypic assays identify azoramide as a small-molecule modulator of the unfolded protein response with antidiabetic activity, Science Translational Medicine, 7 (292), 292ra98-292ra98. doi : 10.1126 / scitranslmed.aaa9134 whole document.

* cited by examiner

PROCESS FOR PREPARING A POTENT THIAZOLE COMPOUND, PHARMACEUTICAL FORMULATION AND USES THEREOF

CROSS-REFERENCE TO RELATED APPLICATIONS

The present application is a § 371 National Phase entry of International Application No. PCT/IB2019/053459, filed Apr. 26, 2019, which claims priority to Indian Patent Application number 201821015990, filed Apr. 27, 2018.

FIELD OF THE INVENTION

The present invention relates to a process for preparing N-[2-[2-(4-chlorophenyl)-4-thiazolyl]ethyl]-butanamide and pharmaceutically acceptable salts thereof. The present invention further relates to a pharmaceutical formulation and the use of said pharmaceutical formulation consisting of N-[2-[2-(4-chlorophenyl)-4-thiazolyl]ethyl]-butanamide as active ingredient for the treatment and prevention of autoimmune diseases and diseases involving skin immunology, skin autoimmune diseases and pigmentation disorders.

BACKGROUND OF THE INVENTION

The immune system is a collection of cells and chemicals that fight infection-causing agents such as bacteria and viruses. An autoimmune disorder occurs when a person's immune system mistakenly attacks their own body cells and tissues. Autoimmune disorders are broadly grouped into two categories-'organ-specific' meaning only one organ is affected, while in 'systemic' disorders, multiple organs or body systems may be affected. Examples of autoimmune diseases are but not limited to, type I diabetes, rheumatoid arthritis, lupus, celiac disease, psoriatic arthritis, multiple sclerosis, pernicious anemia, Sjogren's syndrome, Grave's disease, inflammatory bowel disease.

Autoimmune diseases are characterized by an abnormal immune response involving either cells or antibodies, that are in either case directed against normal autologous tissues. Both adaptive immune response, comprising T-cell mediated immunity, and humoral immune response, involving antibody-mediated immunity is involved in the trigger and spread of autoimmune diseases.

It has been observed that most of the existing therapies for autoimmune disorders aim to provide only symptomatic benefit to patients, as there is little by way of targeted and effective therapy. Administration of steroids is one of the most common approach for treatment. However, the non-specific nature and side-effects associated with long-term steroid usage limits their usefulness.

An immunologically active organ in the body that is continuously exposed to external stressors owing to its location as a barrier between the external and internal environment is skin. Diseases of the skin can arise due to deregulation of both 'organ-specific' as well as 'systemic' physiological pathways. The accessibility of skin makes phenotypic identification of perturbations easy and hence skin is often thought to be a reflection of internal health. Immune activity in skin is tightly coordinated through interactions between different skin cells (melanocytes, keratinocytes and fibroblasts) and variety of skin-resident and circulatory immune cells. This coordination allows the skin to fight pathogens while maintaining tolerance to self-antigens. However, a breakdown of this network results in autoimmune diseases including, but not limited to vitiligo, psoriasis, lichen-planus, scleroderma, pemphigus, bullous, epidermolysis bullosa, systemic lupus erythematosus, dermatomyositis, alopecia areata, atopic dermatitis and eczema.

As an example, vitiligo is an autoimmune disease where dysregulation of immune functions takes place with increased levels of inflammatory cytokines in the lesion. Hence, topical corticosteroids become the most common first line therapy. Patients are also advised to expose themselves to sunlight in order to increase melanin synthesis. Phototherapy (narrowband UVB or 311 nm laser) is generally included with topical steroids to achieve better results. Vitamin D3 analogs and topical antioxidants are also recommended.

Patients recalcitrant to the first line of therapy are suggested PUVA (psoralens+UVA) or KUVA (khellin+UVA). Monochromatic excimer laser or helium neon laser also produce better results in some patients. In this regimen, systemic corticosteroids and calcineurin inhibitors are also included. As an alternative photosensitizer, L-phenylalanine is used. L-phenylalanine is also used in oral supplementation. Oral and topical antioxidants such as vitamin C, vitamin E/K, alpha lipoic acid, Ginkgo biloba extracts are used to protect melanocytes from oxidative stress induced destruction.

Surgical treatments are also known for treating such diseases. However, a surgical treatment is recommended only for those patients in whom vitiligo is stable. These procedures include blister grafts, split thickness graft, punch graft or autologous melanocytes or melanocytes+keratinocytes transplantation.

Patients with progressive vitiligo may opt to undergo complete depigmentation to achieve homogenous skin colour. Camouflage as a cosmetic aid and psychotherapy are suggested at each stage of the treatment.

Several studies have recently implicated the role of perturbations of ER (endoplasmic reticulum) function and chronic ER stress in the pathophysiology and maintenance of chronic diseases, ranging from metabolic, neurodegenerative, immune-mediated to cancers. ER stress also plays a crucial role in triggering autoimmunity against self-antigens. For example, ER stress in pancreatic beta-cells precedes the clinical onset of type-I diabetes, an autoimmune disease. In a recent study, a small-molecule called N-[2-[2-(4-chlorophenyl)-4-thiazolyl]ethyl]-butanamide has been described that improves ER's functional ability by increasing ER protein folding output, while chronically inducing chaperone expression. N-[2-[2-(4-chlorophenyl)-4-thiazolyl]ethyl]-butanamide treatment improved insulin sensitivity, glucose tolerance and B-cell function in multiple obese-diabetic mouse preclinical models. N-[2-[2-(4-chlorophenyl)-4-thiazolyl]ethyl]-butanamide was also effective in preventing the death of cells that expressed a mutant from of rhodopsin identified in autosomal dominant retinitis pigmentosa and associated protein misfolding and ER stress. The unique property of N-[2-[2-(4-chlorophenyl)-4-thiazolyl]ethyl]-butanamide to restore ER homeostasis may represent a therapeutic opportunity against disorders involving dysregulation of ER function, particularly autoimmune diseases and diseases involving skin immunology, skin autoimmune diseases and pigmentation disorders. These include but not limited to vitiligo, psoriasis, atopic dermatitis and eczema, lichen-planus, scleroderma, pemphigus, bullous, epidermolysis bullosa, systemic lupus erythematosus, dermatomyositis, alopecia areata.

OBJECTIVE OF THE INVENTION

The primary object of the present invention is to provide for the therapeutic applications of the formula I: N-[2-[2-

(4-chlorophenyl)-4-thiazolyl]ethyl]-butanamide or pharmaceutically acceptable salts thereof, by way of compositions, formulations, and as a part of any therapeutic or prophylactic treatment.

Yet another object of the present invention is to provide for novel and inventive processes to obtain the compound of formula N-[2-[2-(4-chlorophenyl)-4-thiazolyl]ethyl]-butanamide along with pharmaceutically acceptable salts thereof.

Another object of the present invention is to provide for various therapeutic applications through all possible modes of administration wherein the formulation or the composition utilized comprises the compound N-[2-[2-(4-chlorophenyl)-4-thiazolyl]ethyl]-butanamide and pharmaceutically acceptable salts thereof, as the active ingredient in a therapeutically effective amount.

A further object of the present invention is to provide for the treatment of autoimmune diseases and diseases involving skin immunology, skin autoimmune diseases and pigmentation disorders that include diseases including but not limited to vitiligo, psoriasis, atopic dermatitis and eczema, lichen-planus, scleroderma, pemphigus, bullous, epidermolysis bullosa, systemic lupus erythematosus, dermatomyositis, and alopecia areata.

Another object of the invention is to provide for the method of treatment of autoimmune diseases particularly skin autoimmune diseases by administering N-[2-[2-(4-chlorophenyl)-4-thiazolyl]ethyl]-butanamide by way of a formulation or a composition or any other therapeutic application.

Yet another object of the invention is to provide for the application of N-[2-[2-(4-chlorophenyl)-4-thiazolyl]ethyl]-butanamide as a medicament and by way of formulations and compositions, in the treatment of autoimmune diseases particularly skin autoimmune diseases and pigmentation disorders including but not limited to diseases such as vitiligo, psoriasis, atopic dermatitis and eczema, lichen-planus, scleroderma, pemphigus, bullous, epidermolysis bullosa, systemic lupus erythematosus, dermatomyositis, and alopecia areata.

SUMMARY OF THE INVENTION

The present invention is directed towards novel formulations of compound of formula N-[2-[2-(4-chlorophenyl)-4-thiazolyl]ethyl]-butanamide.

The present invention is also directed towards the process of preparation of N-[2-[2-(4-chlorophenyl)-4-thiazolyl]ethyl]-butanamide as represented by formula I:

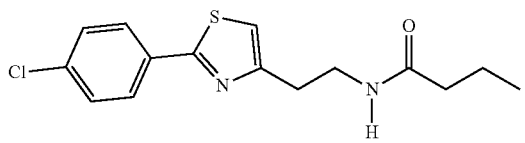 [SMILES: CCCC(=O)NCCc1csc(-c2ccc(Cl)cc2)n1]

The present invention further relates to the therapeutic application of compound of formula N-[2-[2-(4-chlorophenyl)-4-thiazolyl]ethyl]-butanamide in the treatment of autoimmune diseases and diseases involving skin immunology including but not limited to, skin autoimmune diseases and pigmentation disorders such as vitiligo, psoriasis, atopic dermatitis and eczema, lichen-planus, scleroderma, pemphigus, bullous, epidermolysis bullosa, systemic lupus erythematosus, dermatomyositis, and alopecia areata.

The present invention also pertains to the novel and inventive use of the compound of formula 1: N-[2-[2-(4-chlorophenyl)-4-thiazolyl]ethyl]-butanamide in the treatment of autoimmune diseases and diseases involving skin immunology, skin autoimmune diseases and pigmentation disorders. The compound of formula 1: N-[2-[2-(4-chlorophenyl)-4-thiazolyl]ethyl]-butanamide has been found to have an unexpected effect and utility in stalling melanocyte death in the vitiligo. Studies demonstrate that N-[2-[2-(4-chlorophenyl)-4-thiazolyl]ethyl]-butanamide has been seen to prevent stress-mediated cell death of melanocyte. Further, N-[2-[2-(4-chlorophenyl)-4-thiazolyl]ethyl]-butanamide improved melanocyte function, as measured by increased melanin content and tyrosinase activity of N-[2-[2-(4-chlorophenyl)-4-thiazolyl]ethyl]-butanamide treated melanocytes.

DETAILED DESCRIPTION

Skin forms an interface between the body's interior and exterior environment. The strategic location of the skin exposes it to numerous environmental threats and necessitates its function as an important barrier tissue, protecting the body against pathogens, processes and events. While the resident epithelial cells constituting keratinocytes make up the physical and chemical barrier, the plethora of immune cells in the dermal and epidermal compartment make up an active immunological barrier. Melanocytes, cells present in the basal epidermal layer, function to produce melanin that gives skin its characteristic color. Skin homeostasis is a complex interplay between these different cell types and also requires constant communication with the systemic immune, neural and endocrine systems. Any deregulation in this network can manifest as skin diseases. Particularly important and common category of skin diseases are autoimmune diseases, a type of condition in which the body's immune system begins to attack and terminate healthy cells and tissues within skin.

Current therapies for skin autoimmune diseases include steroids, phototherapy, vitamin D3 and immunomodulators. These treatments work partially and only in a small subpopulation of patients and hence there is a need to develop more effective therapies. A common autoimmune disease affecting skin pigmentation is vitiligo, where immune mediated cell death of melanocytes occur. Interestingly, melanocytes present at the margin of the depigmented lesion in vitiligo demonstrate altered morphology of ER, suggesting the involvement of ER stress in disease spread. The underlying molecular pathway leading to melanocytes stress followed by their death has been utilized into formulating a pathway for possible treatment of autoimmune disorders. The inventors theorized that targeting this pathway may contribute in reducing autoimmune mediated cell death of melanocytes. The molecule selected and studied in the present invention has been shown to impact this step and rescue melanocytes from stress induced death and hence have the ability to assist in reducing vitiligo and other autoimmune diseases in patients.

The inventors have struck upon a compound after much experimentation that exhibits the ability to improve ER's functional ability by increasing ER protein folding output while chronically inducing chaperone expression. N-[2-[2-(4-chlorophenyl)-4-thiazolyl]ethyl]-butanamide treatment improved insulin sensitivity, glucose tolerance and β-cell function in multiple obese-diabetic mouse preclinical models. N-[2-[2-(4-chlorophenyl)-4-thiazolyl]ethyl]-butanamide was also effective in preventing the death of cells that expressed a mutant from of rhodopsin identified in autosomal dominant retinitis pigmentosa and associated protein misfolding and ER stress. The unique property of N-[2-[2-(4-chlorophenyl)-4-thiazolyl]ethyl]-butanamide to restore ER homeostasis was understood to represent a therapeutic opportunity against disorders involving dysregulation of ER function, particularly autoimmune diseases and diseases involving skin immunology, skin autoimmune diseases and pigmentation disorders. These include Vitiligo, Psoriasis, Atopic dermatitis and eczema, lichen-planus, Scleroderma, Pemphigus, Bullous, Epidermolysis bullosa, Systemic lupus erythematosus, dermatomyositis, Alopecia areata.

Terms as reflected in the present invention are defined as follows:

The term "pharmaceutically acceptable" used herein refers usually to a substance is usable in the pharmaceutical field and is harmless to a product or a mammal, or a substance has a reasonable or acceptable ratio of effect/risk.

The term "(Ar/$N_2$) atmosphere" pertains to Argon or nitrogen

The phrase "Rochelle salt" has the meaning Potassium sodium tartrate tetrahydrate The phrase "10% Pd/C" ref 10% palladium charcoal The abbreviations used in the present invention are well known to the person skilled in the art and have the meaning as defined below:

The abbreviation "DIPEA" refers to diisopropylethylamine

The abbreviation "DCM" refers to dicloromethane

The abbreviation "DMF" refers to dimethyl formamide

The abbreviation "MsCl" refers to methylsulphonyl Chloride

The abbreviation "TLC" refers to thin layer chromatography

The abbreviation "$^1$HNMR" refers to proton nuclear magnetic resonance

The abbreviation "TPP" refers to triphenyl phosphine

The abbreviation "DIBAL-H" refers to diisobutylaluminium hydride

The abbreviation "THF" refers to tetrahydrofuran

The abbreviation "RT" refers to room temperature

The abbreviation "EDTA" refers to ethylenediamine tetra acetic acid

The abbreviation "API" refers to active pharmaceutical ingredient

The abbreviation "Tm" refers to tunicamycin

"Bradford's reagent" would mean the commercially available reagent used fo protein estimation.

The abbreviation "MBTH" refers to 3-methyl-2-benzothiazolinone hydrazone hydrochloride hydrate "MTT Assay" refers to using of MTT (3-(4 5-dimethylthiazol-2-yl)-2 5-diphenyltetrazolium bromide) for cell viability estimation.

The abbreviation "DMSO" refers to dimethyl sulfoxide

The phrase "Triton X-100" refers to is non ionic surfactant

The abbreviation "PBS" refers to phosphate buffer saline

The abbreviation "L-DOPA" refers to L-3,4-dihydroxyphenylalanine

The abbreviation "NHEM" refers to normal human epidermal melanocytes

The abbreviation "LDH" refers to lactate dehydrogenase

"Tyrosinase activity" refers to of enzyme activity of melanocytes' tyrosinase, an enzyme required for the synthesis of the pigment melanin.

"Tunicamycin effect" refers to of induction of ER stress by Tm treatment followed by reduction in cell viability.

Figure 3:
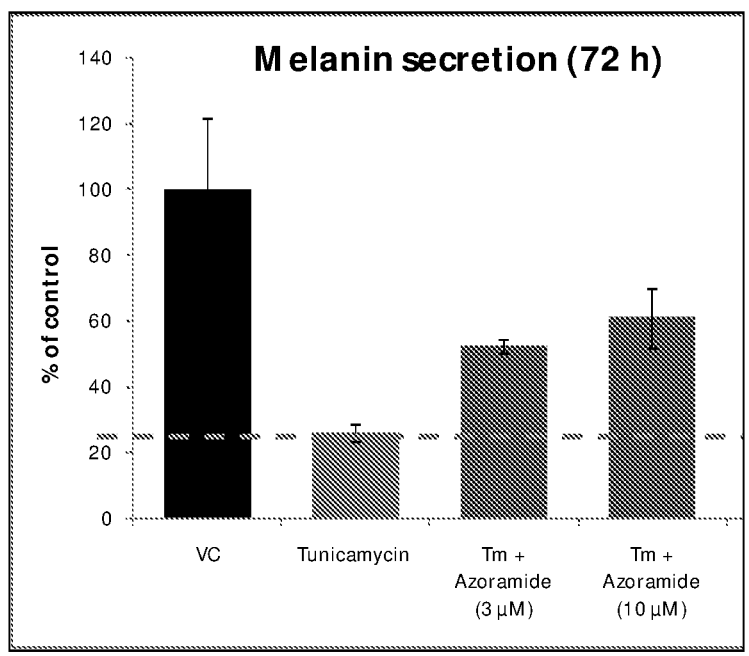

"VC" as reflected in FIG. 3 (in the X-axis-abscissa) is vehicle control

Figure 4:
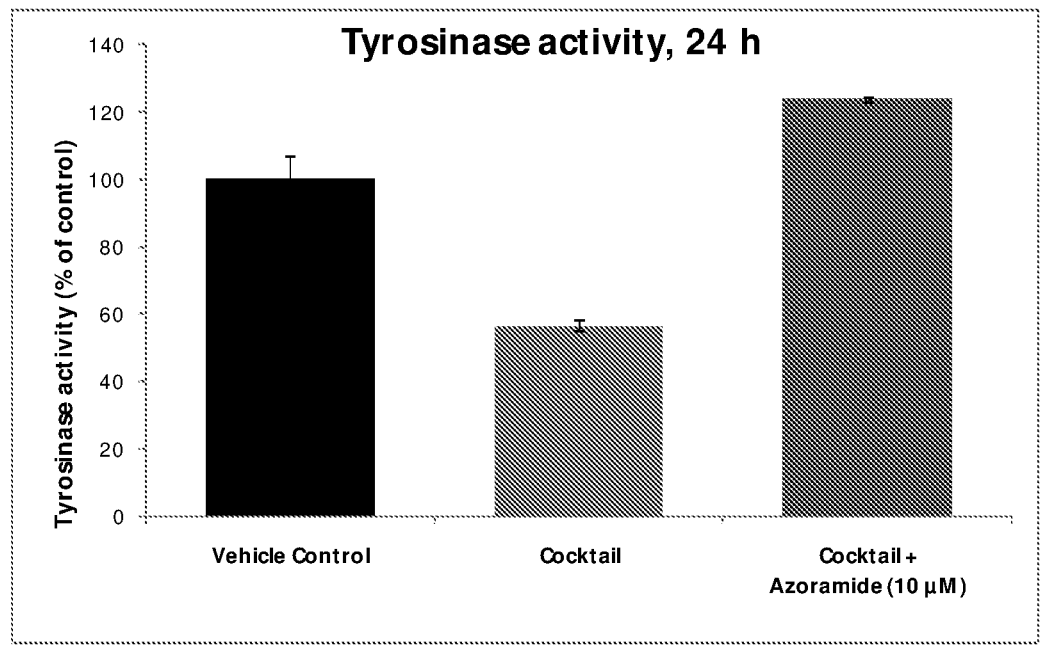

In FIG. 4—Cocktail of inflammatory cytokines—Inflammatory cytokines cause inflammation in the system and are implicated for the vitiligo pathology. The "cocktail of inflammatory cytokines" include tumour necrosis factor-alpha (TNFα), interleukin-1 beta (IL-1B) and interferon gamma (IFNγ) at a final concentration of 10 ng/ml each.

"PG" propylene glycol

"Kolliphor® RH40" refers to polyoxyl 40 hydrogenated castor oil

"1% HPMC solution" refers to hydroxypropyl methyl cellulose

The terms "optional" or "optionally" means that the subsequently described event or circumstance can or cannot occur, and that the description includes instances where said event or circumstance occurs and instances where it does not.

The term "subject" can be a vertebrate, such as a mammal, a fish, a bird, a reptile, or an amphibian. Thus, the subject of the herein disclosed methods can be a human, non-human primate, horse, pig, rabbit, dog, sheep, goat, cow, cat, guinea pig or rodent. The term does not denote a particular age or sex. Thus, adult and newborn subjects, as well as fetuses, whether male or female, are intended to be covered. In one aspect, the subject is a mammal. A patient refers to a subject afflicted with a disease or disorder. The term "patient" includes human and veterinary subjects.

The term "treatment" refers to the medical management of a patient with the intent to cure, ameliorate, stabilize, or prevent a disease, pathological condition, or disorder. This term includes active treatment, that is, treatment directed specifically toward the improvement of a disease, pathological condition, or disorder, and also includes causal treatment, that is, treatment directed toward removal of the cause of the associated disease, pathological condition, or disorder. In addition, this term includes palliative treatment, that is, treatment designed for the relief of symptoms rather than the curing of the disease, pathological condition, or disorder; preventative treatment, that is, treatment directed to minimizing or partially or completely inhibiting the development of the associated disease, pathological condition, or disorder; and supportive treatment, that is, treatment employed to supplement another specific therapy directed toward the improvement of the associated disease, pathological condition, or disorder. In various aspects, the term covers any treatment of a subject, including a mammal (e.g., a human), and includes: (i) preventing the disease from occurring in a subject that can be predisposed to the disease but has not yet been diagnosed as having it; (ii) inhibiting the disease, i.e., arresting its development; or (iii) relieving the disease, i.e., causing regression of the disease. In one aspect, the subject is a mammal such as a primate, and, in a further aspect, the subject is a human. The term "subject" also includes domesticated animals (e.g., cats, dogs, etc.), livestock (e.g., cattle, horses, pigs, sheep, goats, etc.), and laboratory animals (e.g., mouse, rabbit, rat, guinea pig, fruit fly, etc.).

The terms "effective amount" and "amount effective" refer to an amount that is sufficient to achieve the desired result or to have an effect on an undesired condition. For example, a "therapeutically effective amount" refers to an amount that is sufficient to achieve the desired therapeutic result or to have an effect on undesired symptoms, but is generally insufficient to cause adverse side effects.

The specific therapeutically effective dose level for any particular patient will depend upon a variety of factors including the disorder being treated and the severity of the disorder; the specific composition employed; the age, body weight, general health, sex and diet of the patient; the time of administration; the route of administration; the rate of excretion of the specific compound employed; the duration of the treatment; drugs used in combination or coincidental with the specific compound employed and like factors well known in the medical arts.

The term "pharmaceutically acceptable" describes a material that is not biologically or otherwise undesirable, i.e., without causing an unacceptable level of undesirable biological effects or interacting in a deleterious manner.

The present invention can be understood more readily by reference to the following detailed description of the invention and the examples included therein.

Before the present compounds, formulations, compositions and/or methods are disclosed and described, it is to be understood that the terminology used herein is for the purpose of describing particular aspects only and is not intended to be limiting. Although any methods and materials similar or equivalent to those described herein can be used in the practice or testing of the present invention, example methods and materials are now described.

The present invention is directed towards the process of preparation of N-[2-[2-(4-chlorophenyl)-4-thiazolyl]ethyl]-butanamide as represented by formula I:

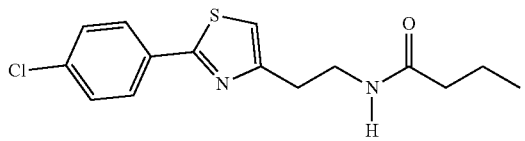 [SMILES: CCCC(=O)NCCc1csc(-c2ccc(Cl)cc2)n1]

The present invention is further directed towards the preparation of formulations and compositions comprising N-[2-[2-(4-chlorophenyl)-4-thiazolyl]ethyl]-butanamide or its pharmaceutically acceptable salts thereof for use in the treatment of skin autoimmune diseases.

The present invention is still further directed towards the use of N-[2-[2-(4-chlorophenyl)-4-thiazolyl]ethyl]-butanamide in therapeutic applications for the treatment of skin autoimmune diseases.

The compound N-[2-[2-(4-chlorophenyl)-4-thiazolyl]ethyl]-butanamide, is an active compound that can be utilised in therapeutic models for the treatment of autoimmune diseases particularly skin autoimmune diseases. The present invention relates to the use of N-[2-[2-(4-chlorophenyl)-4-thiazolyl]ethyl]-butanamide as the active compound in the treatment of skin autoimmune diseases including vitiligo.

The present invention is further directed towards the process of preparation of N-[2-[2-(4-chlorophenyl)-4-thiazolyl]ethyl]-butanamide as represented by formula I:

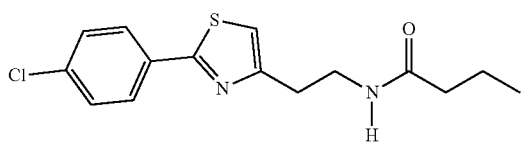 [SMILES: CCCC(=O)NCCc1csc(-c2ccc(Cl)cc2)n1]

Preparation Procedure I

1) Ethyl 2-(2-(4-chlorophenyl) thiazol-4-yl)acetate

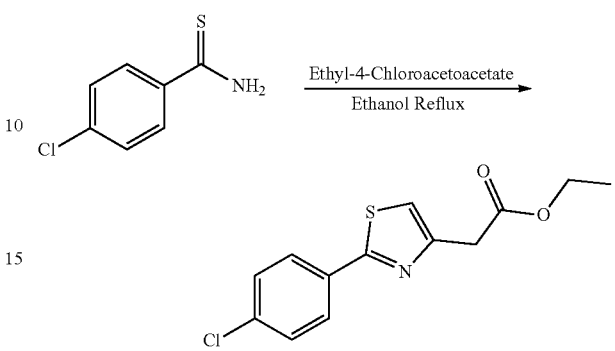

Procedure-

4-Chlorobenzathiomide (1 g) was dissolved in ethanol (15 ml) in inert atmosphere at room temperature. Ethyl 4-chloroacetoacetate (0.9 ml) was then added and refluxed. The progress of reaction was monitored by TLC. After completion of reaction it was cooled to room temperature and concentrated to remove ethanol using rotavapor. The compound was extracted using ethyl acetate, washed with saturated sodium bicarbonate solution, water and finally with saturated brine solution. The organic layer was dried over sodium sulphate and further concentrated through rotavapor.

The compound was purified using column chromatography and characterized by $^1$H NMR. $^1$H NMR (500 MHz, DMSO-$d_6$) δ 7.93 (dt, J=9 Hz, 2.2 Hz, 2H), 7.59 (s, 1H), 7.59-7.53 (m, 2H), 4.14 (q, J=7.1 Hz, 2H), 3.91 (s, 2H), 1.22 (t, J=6.9 Hz, 3H).

Yield: 1.3 g (81%).

2) 2-(2-(4-chlorophenyl) thiazol-4-yl) ethan-1-ol

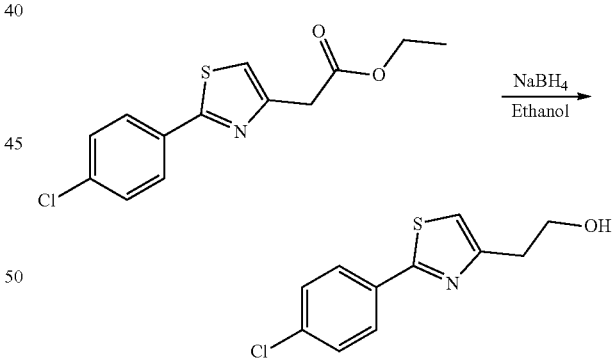

Procedure-

Ethyl 2-(2-(4-chlorophenyl) thiazol-4-yl)acetate (1 g) was added in ethanol (15 ml) under nitrogen atmosphere. It was cooled and then sodium borohydride was added slowly at 0° C., reaction was kept under stirring for overnight from 0° C. to room temperature. The progress of reaction was monitored by TLC and after completion of reaction, it was cooled and quenched by adding 1N HCl slowly. The compound was extracted with ethyl acetate, washed ethyl acetate layer with water and saturated brine solution. The organic layer was further dried over sodium sulphate and concentrated through rotavapor. The compound was characterized by using H$^1$ NMR.

NMR (500 MHz, DMSO-$d_6$) δ 8.23 (dt, J=9 Hz, 2.2 Hz, 2H), 7.85-7.83 (m, 2H), 7.41 (s, 1H), 4.71 (t, J=5.2 Hz, 1H), 3.77 (q, J=6.2 Hz, 2H), 2.92 (t, J=6.9 Hz, 2H).

Yield—0.71 g (84%).

3) 4-(2-Azidoethyl)-2-(4-chlorophenyl) thiazole

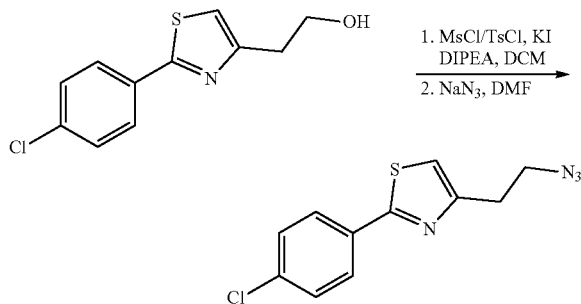

Procedure- 2-(2-(4-chlorophenyl) thiazol-4-yl) ethan-1-ol (1 g) was added in DCM under nitrogen atmosphere then DIPEA and methylsulphonyl chloride was added to it respectively, the reaction was kept under stirring for 3 hour. The progress of reaction was monitored by TLC. After completion of reaction, it was quenched by adding slowly saturated sodium bicarbonate solution. The compound was extracted using ethyl acetate and then organic layer was washed with water and saturated brine solution. The organic layer was dried over sodium sulphate and then concentrated to obtain crude. To this crude added DMF in inert (Ar/$N_2$) atmosphere. Then it KI was added to it followed by $NaN_3$ and reaction was kept under stirring for overnight in absence of light. The progress of reaction was monitored by TLC. After completion of reaction, water was added to it and then compound was extracted with ethyl acetate, washed organic layer with water and saturated brine solution and dried organic layer over sodium sulphate and concentrated using rotavapor.

The final compound was purified using column chromatography and characterized by $^1$HNMR. $^1$H NMR (500 MHz, DMSO-$d_6$) δ 7.93 (dt, J=9 Hz, 2.2 Hz, 2H), 7.55-7.53 (m, 2H), 7.41 (s, 1H), 2.8 (t, 2H), 2.1 (t, J=6.9 Hz, 2H).

Yield—0.54 g (49%).

4) N-(2-(2-(4-chlorophenyl) thiazol-4-yl)ethyl) butyramide

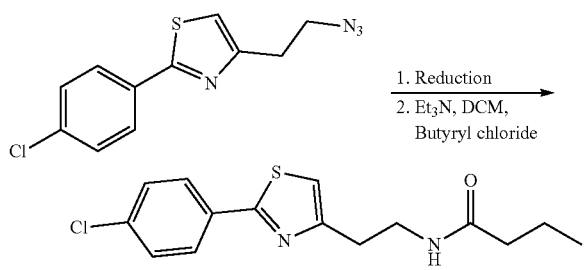

Procedure- (a) 4-(2-Azidoethyl)-2-(4-chlorophenyl) thiazole (1 g) was added in methanol (10 ml) in inert (Ar/$N_2$) atmosphere. Trimethyl phsophine (TPP, 1.4 g) was added to it and was heated to reflux. The completion of reaction was monitored by TLC. The reaction mass was cooled and solvent was removed under reduced pressure to obtain crude amine. The amino compound was purified by using recrystallization (methanol and chloroform).

(b) 4-(2-Azidoethyl)-2-(4-chlorophenyl) thiazole (1 g) was added in ethanol (8 ml) then water was added under stirring. To this solution ammonium chloride (0.4 g) and zinc (0.74 g) was added and reaction was refluxed, the completion of reaction was monitored by TLC, after completion of reaction it was cooled and then added aq. ammonia and ethyl acetate, washed ethyl acetate layer with water and saturated brine solution. The organic layer was dried over sodium sulphate and was then concentrated. The amino compound was purified by using recrystallization.

To this amine compound DCM (10 ml) and triethyl amine (4 ml) at 0° C. cooled condition then butyryl chloride (2 ml) was added. The completion of reaction was monitor by TLC after completion of reaction concentrated reaction mass extract compound using ethyl acetate, washed with water and brine solution, organic layer was dried over sodium sulphate and then concentrated. The final compound was purified using column chromatography characterized by NMR. $^1$H NMR (400 MHz, DMSO-$d_6$) δ 7.93 (d, 2H), 7.88 (s, 1H), 7.57 (d, 2H), 7.41 (s, 1H), 3.42 (t, 2H), 2.89 (t, 2H), 2.03 (t, 2H), 1.54-1.45 (m, 2H), 0.83 (t, 3H)

MS: 309 (M+H), 331 (M+Na).

Yield 0.4 g (35%).

Preparation Procedure II

1) Ethyl 2-(2-(4-chlorophenyl) thiazol-4-yl)acetate

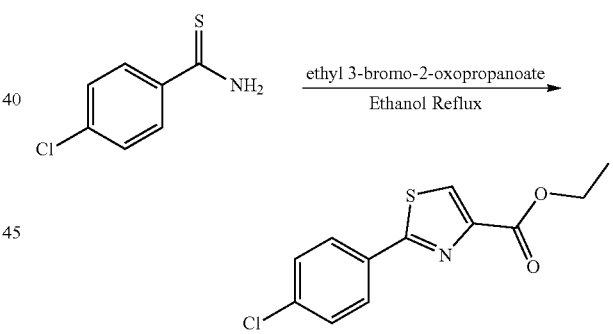

Procedure-

4-Chlorobenzathiomide (1 g) was added in ethanol under inert atmosphere at room temperature. Ethyl 3-bromo-2-oxopropanoate (1.25 g) was added to this solution and heated to reflux. The completion of reaction was monitored by TLC. After completion of reaction, reaction mass was cooled to room temperature and then concentrated. The compound was extracted using ethyl acetate, washed with saturated sodium bicarbonate solution then with water and finally with saturated brine solution. Further the organic layer was dried over sodium sulphate and concentrated.

The compound was purified using column chromatography and compound was characterized by NMR.

$^1$H NMR (500 MHz, DMSO-$d_6$) δ 7.93 (dt, J=9 Hz, 2.2 Hz, 2H), 7.59 (s, 1H), 7.59-7.53 (m, 2H), 4.14 (q, J=7.1 Hz, 2H), 3.91 (s, 2H), 1.22 (t, J=6.9 Hz, 3H). Yield: 1.1 g (68%).

2) 2-(4-chlorophenyl) thiazole-4-carbaldehyde

4) 2-(4-chlorophenyl) thiazole-4-yl) ethane-1-amine

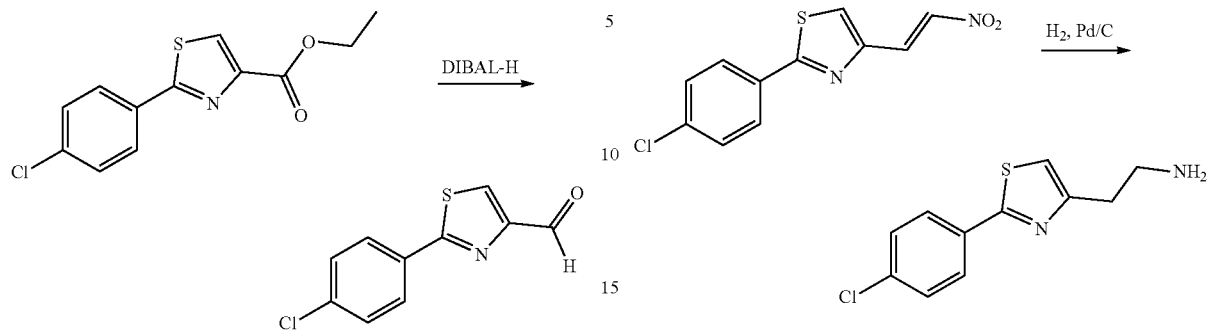

Procedure-

Ethyl 2-(2-(4-chlorophenyl) thiazol-4-yl)acetate ((1 g) was dissolved in DCM (10 ml) and cooled to −78 C. A separate flask was charged with DIBAL-H (in 10 ml DCM) and also cooled to −78 C. The DIBAL-H (0.55 g) solution was added over 20-25 min then stirred at −78 C for 1 hour. The reaction mixture was quenched by adding methanol (10 mL) and stirred at −78 C for 15 min. The cold solution was transferred to another flask containing a saturated Rochelle salt solution (10 ml) and stirred for 3.5 h. The aqueous phase was separated and extracted further with DCM. The combined organic layers were washed with brine, dried sodium sulphate and concentrated.

The compound was purified using column chromatography and characterized by $^1$H NMR.

$^1$H NMR (500 MHz, DMSO-d$_6$) δ 9.75 (s, 1H), 8.5 (s, 1H), 8.02 (d, 2H), 7.53 (d, 2H)

Yield 0.51 (64%)

Procedure-

10% Pd/C was added under a N$_2$ atmosphere to a chilled (ice bath) solution of 2-(4-chlorophenyl)-4-(2-nitrovinyl) thiazole (1 g) in MeOH. The flask was repeatedly evacuated and flushed with H$_2$ gas. The resulting mixture was allowed to warm to RT and left to stir for 72 h under H$_2$. The vessel was subsequently purged with N$_2$ gas. The vessel was chilled (ice bath) and additional 10% Pd/C was added. The flask was repeatedly evacuated and flushed with H$_2$. The mixture was allowed to warm to RT and stir for 6 h under H$_2$. The vessel was purged with N$_2$ and the crude reaction mixture was filtered through a short plug of celite. The reaction vessel and celite were rinsed with MeOH. The combined filtrates were concentrated. The final compound was purified by recrystallization and characterized by $^1$H NMR:

$^1$H NMR (400 MHz, DMSO-d$_6$) δ 8.25 (s, 2H), 7.95 (d, 2H), 7.59 (s, 1H), 7.56 (d, 2H), 3.17 (s, 4H), MS: 239 (M+H).

Yield: 0.56 g (62%).

3) 2-(4-chlorophenyl)-4-(2-nitrovinyl) thiazole

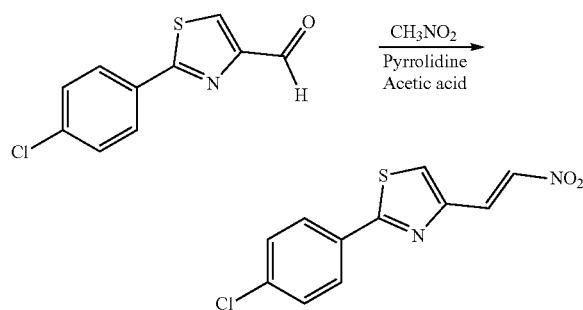

Procedure- 2-(4-chlorophenyl) thiazole-4-carbaldehyde (1 g) was dissolved in THF under inert atmosphere. Nitromethane (0.73 ml), pyrrolidine (0.037) and acetic acid were added to it at room temperature. Reaction was kept under stirring for 1 to 1.5 hour, monitored reaction by TLC, and after completion of reaction it was concentrated up to 85-90%. Further it was stirred by adding water, filtered the solid through buckner funnel and was washed with water and dried. The compound was characterized by $^1$H NMR.

$^1$H NMR (500 MHz, DMSO-d$_6$) δ 13.29 (s, 1H), 8.06 (d, 1H), 8.01 (d, 2H), 7.81 (s, 1H), 7.59 (d, 2H),

Yield—1.1 g

5) N-(2-(2-(4-chlorophenyl) thiazol-4-yl)ethyl) butyramide

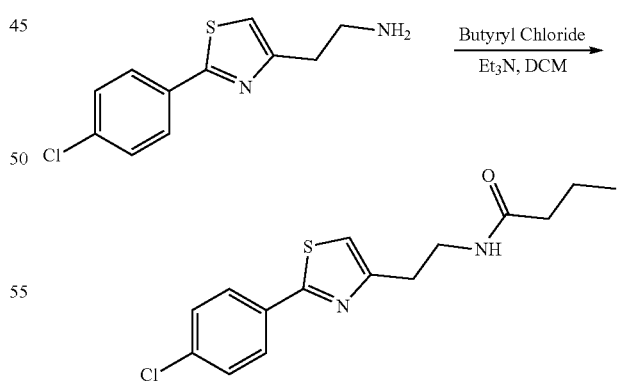

Procedure- 2-(4-chlorophenyl) thiazole-4-yl) ethane-1-amine (1 g) was dissolved in DCM under inert atmosphere. In this solution triethyl amine (0.6 ml) and Butyryl chloride (2 ml) were added at ice cooled temperature. The completion of reaction was monitored by TLC and after completion of reaction, it was concentrated and extracted compound using ethyl acetate, washed with water and brine solution, dried organic layer over sodium sulphate and concentrated. The final compound was purified using column chromatography and further characterized by $^1$H NMR.

$^1$H NMR (400 MHz, DMSO-$d_6$) δ 7.93 (d, 2H), 7.88 (s, 1H), 7.57 (d, 2H), 7.41 (s, 1H), 3.42 (t, 2H), 2.89 (t, 2H), 2.03 (t, 2H), 1.54-1.45 (m, 2H), 0.83 (t, 3H).

MS: 309 (M+H), 331 (M+Na). Yield 0.4 g (35%).

The present invention is also directed towards formulations comprising N-[2-[2-(4-chlorophenyl)-4-thiazolyl]ethyl]-butanamide or its pharmaceutically acceptable salts thereof that can be used in the treatment of skin autoimmune diseases such as vitiligo.

For example, it is suitable for oral, parenteral, topical, transdermic, intravenous, rectal, sublingual and nasal administration. It is further envisaged that in the treatment of skin autoimmune diseases, N-[2-[2-(4-chlorophenyl)-4-thiazolyl]ethyl]-butanamide or pharmaceutically acceptable salts thereof by way of a formulation or a composition, may also be administered via intramuscular, subcutaneous, intravenous and peridural administration.

N-[2-[2-(4-chlorophenyl)-4-thiazolyl]ethyl]-butanamide or pharmaceutically acceptable salts thereof comprising compositions are intended to be administered by any suitable route, including orally, parenterally, rectally, topically and locally. They may be typically formulated and administered in unit-dosage forms such as tablets, capsules, pills, powders, granules, sterile parenteral solutions or suspensions, and oral solutions or suspensions, and oil-water emulsions containing suitable quantities of the active ingredient or multiple-dosage forms.

Suitable pharmaceutical preparations may also be prepared such as solutions, suspensions, tablets, dispersible tablets, pills, capsules, powders, sustained release formulations or elixirs, for oral administration or in sterile solutions or suspensions for parenteral administration, as well as transdermal patch preparation and dry powder inhalers.

The present invention further relates to therapeutically effective dose of all preparations comprising N-[2-[2-(4-chlorophenyl)-4-thiazolyl]ethyl]-butanamide or pharmaceutically acceptable salts thereof for the effective treatment of autoimmune diseases and diseases involving skin immunology, skin autoimmune diseases and pigmentation disorders including but not limited to diseases such as vitiligo, psoriasis, atopic dermatitis and eczema, lichen-planus, scleroderma, pemphigus, bullous, epidermolysis bullosa, systemic lupus erythematosus, dermatomyositis, and alopecia areata.

The present invention envisages pharmaceutical preparations comprising N-[2-[2-(4-chlorophenyl)-4-thiazolyl]ethyl]-butanamide or pharmaceutically acceptable salts thereof in an effective amount may be utilized in all kinds of formulations and compositions in therapeutic applications for the treatment of autoimmune diseases and diseases involving skin immunology, skin autoimmune diseases and pigmentation disorders including but not limited to diseases such as vitiligo, psoriasis, atopic dermatitis and eczema, lichen-planus, scleroderma, pemphigus, bullous, epidermolysis bullosa, systemic lupus erythematosus, dermatomyositis, and alopecia areata.

The present invention is also directed towards formulations comprising N-[2-[2-(4-chlorophenyl)-4-thiazolyl]ethyl]-butanamide or pharmaceutically acceptable salts thereof for topical administration in the form of a gel, cream, any spreadable composition, ointment or lotion. Without limiting the scope of the invention, some exemplary formulations comprising N-[2-[2-(4-chlorophenyl)-4-thiazolyl]ethyl]-butanamide as per the disclosure in the present invention have been provided.

In an embodiment of the present invention, formulations for use in the topical administration may have excipients that are suitable to the pharmaceutically active N-[2-[2-(4-chlorophenyl)-4-thiazolyl]ethyl]-butanamide drug: wherein the strength of the strength of the active compound in the topical formulation is from 0.1% to 90% and to be more specific range 0.1% to 20%.

The formulation as envisaged by the present invention may further comprise pharmaceutically acceptable and therapeutically acceptable amount of the following excipients.

Emollient/stiffening agent/ointment base crucial as the main structure-forming materials for semisolid dosage may be added in the formulation. Examples of the same comprise cetyl alcohol, cetyl ester wax, emulsifying wax, hydrous lanolin, lanolin, lanolin alcohols, microcrystalline wax, paraffin, petrolatum, polyethylene glycol, stearic acid, stearyl alcohol, white wax.

The emulsifying agent/solubilizing agent used as surfactants in order to reduce the interfacial tension to stabilize emulsions and to improve the wetting and solubility of hydrophobic materials may be added in the formulation. Examples of the same comprise polysorbate 20, polysorbate 80, polysorbate 60, poloxamer, emulsifying wax, sorbitan monostearate, sorbitan monooleate, sodium lauryl sulfate, propylene glycol monostearate, diethylene glycol monoethyl ether, docusate sodium.

A thickening/gelling agent may be selected from a group comprising carbomer, methyl cellulose, sodium carboxyl methyl cellulose, carrageenan, colloidal silicon dioxide, guar gum, hydroxypropyl cellulose, hydroxypropyl methyl cellulose, gelatin, polyethylene oxide, alginic acid, sodium alginate.

Humectant (polyols) may be added to the formulation and may be selected from a group comprising glycerin, propylene glycol, polyethylene glycol, sorbitol solution, 1,2,6 hexanetriol.

Preservatives are also added in the formulation. They may be selected from a group comprising benzoic acid, propyl paraben, methyl paraben, sorbic acid, potassium sorbate, benzalkonium chloride, phenyl mercuric acetate, chlorobutanol, phenoxyethanol.

A permeation enhancer is also further added to the formulation. It may be selected from a group comprising propylene glycol, ethanol, isopropyl alcohol, oleic acid, polyethylene glycol.

An antioxidant is added to the formulation may be selected from butylated hydroxyanisole, butylated hydroxytoluene.

Chelating agents may also be added in the formulation and may be EDTA.

A buffer may be selected from citric acid, phosphoric acid, sodium hydroxide, monobasic sodium phosphate, triethanolamine.

Further, any solvent to facilitate the dispersion or dissolution of the active ingredient, may be selected from a group comprising purified water, hexylene glycol, propylene glycol, oleyl alcohol, propylene carbonate.

The present invention also discloses a novel and inventive method of arriving at N-[2-[2-(4-chlorophenyl)-4-thiazolyl]ethyl]-butanamide.

The present invention is further directed towards the use of the active compound of Formula I for the manufacture of a medicament for the treatment of diseases involving skin immunology, skin autoimmune diseases and pigmentation disorders that include diseases such as vitiligo, psoriasis, atopic dermatitis and eczema, lichen-planus, scleroderma, pemphigus, bullous, epidermolysis bullosa, systemic lupus erythematosus, dermatomyositis, and alopecia areata.

The present invention also pertains to formulations comprising N-[2-[2-(4-chlorophenyl)-4-thiazolyl]ethyl]-butanamide for the treatment of pigmentation disorders and skin autoimmune diseases including vitiligo.

The present inventors have found an unexpected utility of N-[2-[2-(4-chlorophenyl)-4-thiazolyl]ethyl]-butanamide and pharmaceutically acceptable salts thereof, in stalling melanocyte death in the vitiligo. Studies demonstrate that N-[2-[2-(4-chlorophenyl)-4-thiazolyl]ethyl]-butanamide and pharmaceutically acceptable salts thereof prevents stress-mediated cell death of melanocytes. Further, it improves melanocyte function, as measured by increased melanin content and tyrosinase activity of the melanocytes treated by N-[2-[2-(4-chlorophenyl)-4-thiazolyl]ethyl]-butanamide. Interestingly, topical formulation of N-[2-[2-(4-chlorophenyl)-4-thiazolyl]ethyl]-butanamide are clearly able to prevent the spread of depigmentation in guinea pig model of vitiligo.

The invention also relates to a composition comprising N-[2-[2-(4-chlorophenyl)-4-thiazolyl]ethyl]-butanamide pharmaceutically acceptable salts thereof, an additional pharmaceutical agent, as a combined preparation for simultaneous, separate or sequential use in the treatment or prevention of autoimmune diseases particularly skin autoimmune diseases. The active compound, N-[2-[2-(4-chlorophenyl)-4-thiazolyl]ethyl]-butanamide, by way of a formulation or a composition, can be utilized in the therapeutic applications for the treatment of skin autoimmune diseases via all modes of administration including oral, parenteral, topical, transdermic, intravenous, rectal, sublingual and nasal administration, rectally, and local.

The present invention further envisages all such formulations that may be prepared for therapeutic applications of N-[2-[2-(4-chlorophenyl)-4-thiazolyl]ethyl]-butanamide for the treatment of pigmentation disorders and skin autoimmune diseases.

The invention is illustrated by the following examples which are only meant to exemplify the invention and by way no means act as a limitation to the same.

Preparation of different cream and gel formulation comprising N-[2-[2-(4-chlorophenyl)-4-thiazolyl]ethyl]-butanamide prepared with diverse excipients. Procedures for cream preparation for 1 gm quantity are provided herein:

| Excipients (%) | Cream/Gel formulations | | | | | | | | | | |
|---|---|---|---|---|---|---|---|---|---|---|---|
| | 1 | 2 | 3 | 4 | 5 | 6 | 7 | 8 | 9 | 10 | 11 |
| Active compound | 10 | 10 | 10 | 5 | 5 | 5 | 5 | 5 | 3 | 1 | 0.3 |
| Ethanol | 10 | 15 | 15 | 15 | 15 | 15 | 15 | — | 20 | 20 | 20 |
| Propylene glycol | 25 | 5 | 5 | 5 | 5 | 5 | 5 | 30 | 10 | 10 | 10 |
| Liquid paraffin | 7 | 6 | — | — | — | — | — | — | | | |
| Cremophor A-25 | — | 1 | — | — | 1 | 1 | — | 1 | | | |
| Kolliphor RH-40 | — | 1 | — | — | 1 | 1 | — | 1 | | | |
| Glycerol monostearate | 5 | — | — | 3 | — | — | — | — | | | |
| Cetostearyl alcohol | 12 | 12 | — | 7 | 12 | 12 | — | 12 | | | |
| Bees wax | — | — | — | 2 | — | — | — | — | | | |
| Carbopol 934 | — | — | 2 | — | — | — | 1 | — | 2 | 2 | 2 |
| Triethanolamine | — | — | 0.5 | 0.2 | 0.5 | 0.5 | 0.5 | 0.5 | 0.5 | 0.5 | 0.5 |
| 0.2% carbopol 934 in water | — | — | — | 62.8 | — | — | — | — | | | |
| 1% Hydroxypropyl methyl cellulose in water | — | — | — | — | — | 60.5 | 73.5 | 50.5 | | | |
| Water | 31 | 50 | 67.5 | — | 60.5 | — | — | — | 64.5 | 66.5 | 67.2 |

Formulation 1:

Preparation of drug phase (A): Accurately weighed amount of N-[2-[2-(4-chlorophenyl)-4-thiazolyl]ethyl]-butanamide (100 mg) was dissolved in ethanol (100 mg), followed by addition of 250 mg of propylene glycol (PG) to the above ethanolic solution.

Preparation of oil phase (B); Cetostearyl alcohol (120 mg), glycerol monostearate (50 mg) were weighed in a glass beaker and maintained at 80° C. on a hot plate to liquefy. Subsequently, liquid paraffin (70 mg) was added to the above oil phase.

Drug phase was mixed in to oil phase with constant stirring and immediately kept at room temperature. Finally, 310 mg of warm water was added with stirring to produce a cream.

Formulation 2:

Preparation of drug phase (A): Accurately weighed amount of N-[2-[2-(4-chlorophenyl)-4-thiazolyl]ethyl]-butanamide (100 mg) was weighed and dissolved in ethanol (150 mg), followed by of addition of PG (50 mg) to the above ethanolic solution.

Preparation of oil phase (B): Cetostearyl alcohol (120 mg), cremophor A-25 (10 mg) were weighed in a glass beaker and maintained at 80° C. on a hot plate to liquefy. Subsequently, Kolliphor® RH40 (10 mg) and liquid paraffin (60 mg) were added to the above oil phase. Drug phase was mixed in to oil phase with constant stirring and immediately kept at room temperature. Finally, 500 mg of warm water was added with stirring to produce a cream.

Formulation 3:

Preparation of drug phase (A): Accurately weighed amount of N-[2-[2-(4-chlorophenyl)-4-thiazolyl]ethyl]-butanamide (100 mg) was dissolved in ethanol (150 mg), followed by addition of PG (50 mg) to the above ethanolic solution.

Preparation of gel phase (B): Carbopol 934 (20 mg) was weighed and soaked in 675 mg of water for 15 min to produce the gel phase.

Drug phase was mixed with stirring to the above gel phase. Finally, 5 mg of triethanolamine was added to the mixture with stirring to produce a gel.

Formulation 4:

Preparation of drug phase (A): Accurately weighed amount of N-[2-[2-(4-chlorophenyl)-4-thiazolyl]ethyl]-butanamide (50 mg) was dissolved in ethanol (150 mg), followed by addition of 50 mg of PG to the above ethanolic solution.

Preparation of oil phase (B): Cetosetaryl alcohol (70 mg), glycerol monostearate (30 mg) and bees wax (20 mg) were weighed in a glass beaker and maintained at 80° C. on a hot plate to liquefy.

Drug phase was mixed to the oil phase. Subsequently, of 0.2% w/v solution of carbapol 934 (628 mg) in water was added to above mixture.

Finally, triethanolamine (2 mg) was added with stirring to above mixture to produce cream.

Formulation 5:

Preparation of drug phase (A): Accurately weighed amount of N-[2-[2-(4-chlorophenyl)-4-thiazolyl]ethyl]-butanamide (50 mg) was dissolved in ethanol (150 mg), followed by addition of PG (50 mg) to the above ethanolic solution.

Preparation of oil phase (B): Cetosetaryl alcohol (120 mg), cremophone A-25 (10 mg) were weighed in a glass beaker and maintained at 80° C. on a hot plate to liquefy. Subsequently, Kolliphor® RH40 was added to the oil phase.

Drug phase was mixed to the oil phase with stirring and immediately kept at room temperature. Warm water (605 mg) was added to the above mixture with stirring.

Finally, triethanolamine (5 mg) was added with stirring to produce cream.

Formulation 6:

Preparation of drug phase (A): Accurately weighed amount of N-[2-[2-(4-chlorophenyl)-4-thiazolyl]ethyl]-butanamide (50 mg) was dissolved in ethanol (150 mg), followed by addition of PG (50 mg) to the above ethanolic solution.

Preparation of oil phase (B); Cetostearyl alcohol (120 mg), cremophone A-25 (10 mg) were weighed in a glass beaker and maintained at 80° C. on a hot plate to liquefy. Subsequently, Kolliphor® RH40 was added to the oil phase.

Drug phase was mixed to the oil phase with stirring and immediately kept at room temperature. 1% HPMC solution (605 mg) was added to drug and oil phase mixture with stirring. Finally, triethanolamine (5 mg) was added with stirring to produce cream.

Formulation 7:

Preparation of drug phase (A): Accurately weighed amount of N-[2-[2-(4-chlorophenyl)-4-thiazolyl]ethyl]-butanamide (50 mg) was dissolved in ethanol (150 mg), followed by addition of PG (50 mg) to the above ethanolic solution.

Preparation of gel phase (B): Carbopol 934 (10 mg) was weighed and soaked in 1% HPMC solution in water (735 mg) for 15 min to produce the gel phase.

Drug phase was mixed with stirring to the above gel phase. Finally, 5 mg of triethanolamine was added to the mixture with stirring to produce a gel.

Formulation 8:

Preparation of drug phase (A): Accurately weighed amount of N-[2-[2-(4-chlorophenyl)-4-thiazolyl]ethyl]-butanamide (50 mg) was dissolved in PG (300 mg).

Preparation of oil phase (B): Cetostearyl alcohol (120 mg), cremophone A-25 (10 mg) were weighed in a glass beaker and maintained at 80° C. on a hot plate to liquefy. Subsequently, Kolliphor® RH40 was added to the oil phase.

Drug phase was mixed to the oil phase with stirring and immediately kept at room temperature. 1% HPMC solution (505 mg) was added to drug and oil phase mixture with stirring. Finally, triethanolamine (5 mg) was added with stirring to produce cream.

Formulation 9:

Preparation of drug phase (A): Accurately weighed amount of N-[2-[2-(4-chlorophenyl)-4-thiazolyl]ethyl]-butanamide (30 mg) was dissolved in ethanol (200 mg), followed by addition of PG (100 mg) to the above ethanolic solution.

Preparation of gel phase (B): Carbopol 934 (20 mg) was weighed and soaked in 645 mg of water for 15 min to produce the gel phase.

Drug phase was mixed with stirring to the above gel phase. Finally, 5 mg of triethanolamine was added to the mixture with stirring to produce a gel.

Formulation 10:

Preparation of drug phase (A): Accurately weighed amount of N-[2-[2-(4-chlorophenyl)-4-thiazolyl]ethyl]-butanamide (10 mg) was dissolved in ethanol (200 mg), followed by addition of PG (100 mg) to the above ethanolic solution.

Preparation of gel phase (B): Carbopol 934 (20 mg) was weighed and soaked in 665 mg of water for 15 min to produce the gel phase. Drug phase was mixed with stirring to the above gel phase. Finally, 5 mg of triethanolamine was added to the mixture with stirring to produce a gel.

Formulation 11:

Preparation of drug phase (A): Accurately weighed amount of N-[2-[2-(4-chlorophenyl)-4-thiazolyl]ethyl]-butanamide (3 mg) was dissolved in ethanol (200 mg), followed by addition of PG (100 mg) to the above ethanolic solution.

Preparation of gel phase (B): Carbopol 934 (20 mg) was weighed and soaked in 672 mg of water for 15 min to produce the gel phase.

Drug phase was mixed with stirring to the above gel phase. Finally, 5 mg of triethanolamine was added to the mixture with stirring to produce a gel The present invention is further directed towards the use of applications of the compound N-[2-[2-(4-chlorophenyl)-4-thiazolyl]ethyl]-butanamide in the treatment of autoimmune diseases.

Particularly, the N-[2-[2-(4-chlorophenyl)-4-thiazolyl]ethyl]-butanamide as obtained by the claimed processes has been surprisingly found to be effective in the therapeutic applications for the treatment of autoimmune diseases particularly skin autoimmune diseases and pigmentation disorders such as vitiligo as described herein below:

EXAMPLES

Test 1:

B16-F10 melanocytes were seeded (5000 cells per well) in 96-well plates for 24 h. Cells were then treated in quadruplicate with indicated concentration of N-[2-[2-(4-chlorophenyl)-4-thiazolyl]ethyl]-butanamide for 6 h. All the compounds dilutions were made in DMSO and the concentration of the vehicle (DMSO) was kept constant (0.1%) in each well. Cells were then treated with 300 ng/ml tunicamycin to cause ER stress and after 72 h of treatment, cells were observed under microscope and images were captured. Then MTT assay was performed to measure the cell viability. Briefly, MTT (0.5 mg/ml) was added to each well and further incubated for 1 h. Culture medium was removed and the reduced MTT (formazen) was dissolved in DMSO (100 μl per well) and measured at 570 nm. Cell growth in vehicle control was calculated as 100% and the effect of the compounds were calculated accordingly.
Result:
FIG. 1 graphically depicts the cell viability with different dosages of N-[2-[2-(4-chlorophenyl)-4-thiazolyl]ethyl]-butanamide.

Figure 2:
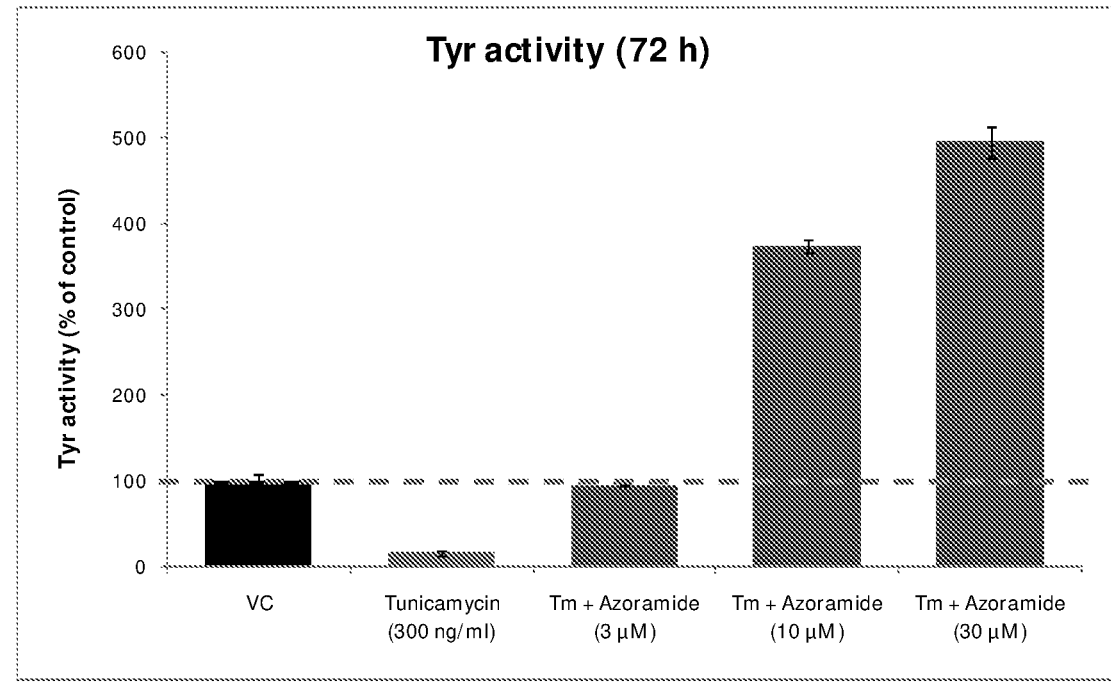

N-[2-[2-(4-chlorophenyl)-4-thiazolyl]ethyl]-butanamide protects melanocytes from tunicamycin induced cell death in a dose dependent manner.
Test 2:
B16-F10 cells were seeded in 24-well plates (20000 cells per well) for 24 h. Cells were then treated with indicated concentrations of N-[2-[2-(4-chlorophenyl)-4-thiazolyl] ethyl]-butanamide. After 6 h of treatment with N-[2-[2-(4-chlorophenyl)-4-thiazolyl]ethyl]-butanamide, tunicamycin (300 ng/ml) was added to the indicated wells. After 72 h of treatments, cells were washed with PBS and lysed in phosphate buffer (pH 6.8) containing 1 mM EDTA and 01% Triton X-100. Lysate was cleared by centrifugation (12000× g) for 10 min and clear lysate (20 µl) was used for tyrosinase assay. The final concentrations of tyrosinase assay mixture were as follows: phosphate buffer (50 mM, pH 6.8), L-DOPA (1 mM), MBTH (6 mM), DMF (2%). Tyrosinase activity was measured by measuring the colored complex formed at 492 nm. Tyrosinase activity was normalized to total cellular proteins measured by Bradford's reagent and represented as % of vehicle control.
Result:
FIG. 2 graphically represents the Tyrosinase activity at different concentrations of N-[2-[2-(4-chlorophenyl)-4-thiazolyl]ethyl]-butanamide. It is seen that N-[2-[2-(4-chlorophenyl)-4-thiazolyl]ethyl]-butanamide increases tyrosinase activity and reverses the tunicamycin effect
Test 3:
Cells were treated as indicated for 72 h. After incubation, cell culture supernatant was used for the estimation of secreted melanin. Secreted melanin was measured at 405 nm against cell culture medium as blank. Melanin levels were normalized to the total cellular proteins and represented as % of control.
Result:
FIG. 3 reflects that effect of N-[2-[2-(4-chlorophenyl)-4-thiazolyl]ethyl]-butanamide on melanin secretion. It is seen that N-[2-[2-(4-chlorophenyl)-4-thiazolyl]ethyl]-butanamide increases melanin levels and reverses the tunicamycin effect.
Test 4:
B16-F10 cells were seeded in 24-well plates (80000 cells per well) for 24 h. Cells were then treated with indicated concentrations of N-[2-[2-(4-chlorophenyl)-4-thiazolyl] ethyl]-butanamide. After 6 h of treatment with N-[2-[2-(4-chlorophenyl)-4-thiazolyl]ethyl]-butanamide, a cocktail of inflammatory cytokines (TNFα, IL1β, IFNγ—10 ng/ml each) was added to indicated wells. After 72 h of treatments, cells were washed with PBS and lysed in phosphate buffer (pH 6.8) containing 1 mM EDTA and 01% Triton X-100. Lysate was cleared by centrifugation (12000×g) for 10 min and clear lysate (20 µl) was used for tyrosinase assay. The final concentrations of tyrosinase assay mixture were as follows: phosphate buffer (50 mM, pH 6.8), L-DOPA (1 mM), MBTH (6 mM), DMF (2%). Tyrosinase activity led to the conversion of L-DOPA into dopachrome that binds to MBTH and forms a color complex which is read at 492 nm. Tyrosinase activity was normalized to total cellular proteins measured by Bradford's reagent and represented as % of vehicle control.

Figure 5:
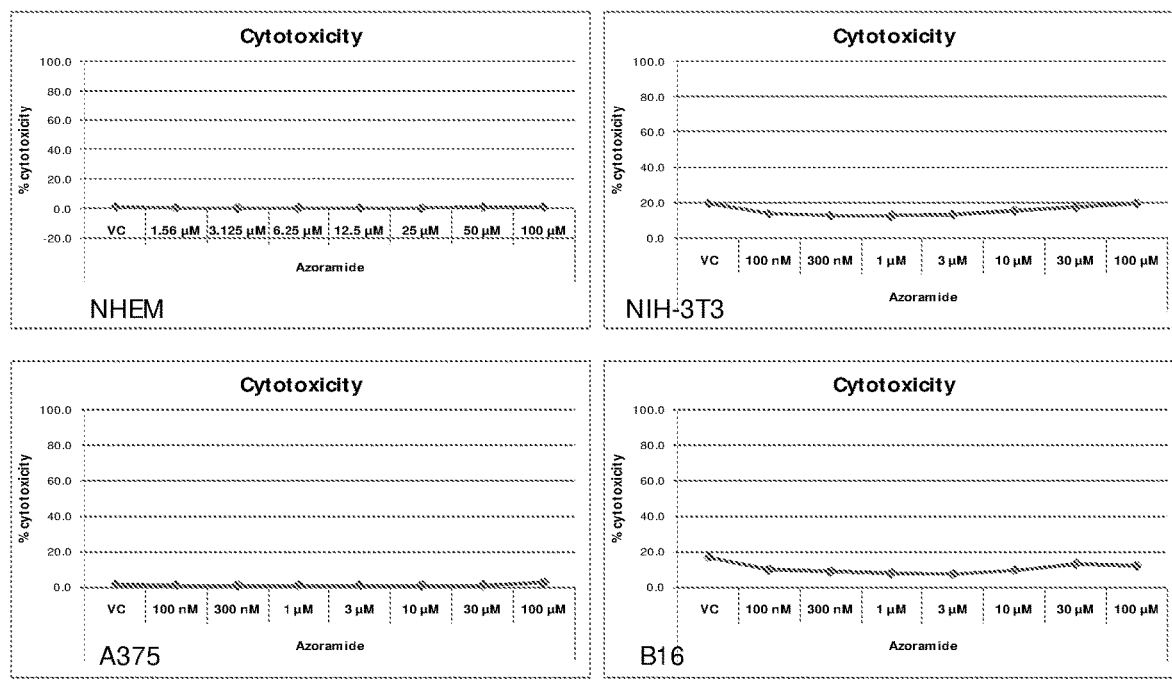
Figure 6:

Result:
FIG. 4 reflects the tyrosinase activity when subject cells are treated with a cocktail of cytokine. It is seen that N-[2-[2-(4-chlorophenyl)-4-thiazolyl]ethyl]-butanamide negates inflammation induced effect in melanocytes
Test 5:
NHEM (normal human epithelial melanocytes), A375 melanoma, B16-F10 melanoma and NIH-3T3 fibroblasts were seeded in 96 well plates for 24 hours. Cells were then treated with VC (DMSO, 0.1%) or with indicated concentrations of N-[2-[2-(4-chlorophenyl)-4-thiazolyl]ethyl]-butanamide for 24 hours. After incubation period, cytotoxicity was measured as % of total LDH released in the culture medium.
Result:
FIG. 5 reflects the cytotoxicity measurements when N-[2-[2-(4-chlorophenyl)-4-thiazolyl]ethyl]-butanamide is utilized to treat subject cells. It is seen that N-[2-[2-(4-chlorophenyl)-4-thiazolyl]ethyl]-butanamide shows no cytotoxicity in a variety of cell lines
Test 6:
Topical formulation (1% w/w N-[2-[2-(4-chlorophenyl)-4-thiazolyl]ethyl]-butanamide) was prepared. Similarly, a placebo formulation was also prepared which was exactly similar to the N-[2-[2-(4-chlorophenyl)-4-thiazolyl]ethyl]-butanamide formulation except the active compound. The animal model of vitiligo was developed in black guinea pigs and the placebo and N-[2-[2-(4-chlorophenyl)-4-thiazolyl] ethyl]-butanamide formulations were applied on to the left and right ears respectively. After the treatment period (4 weeks), N-[2-[2-(4-chlorophenyl)-4-thiazolyl]ethyl]-butanamide formulation treated ears showed enhanced pigmentation compared to placebo treated ears.
Result:
FIG. 6 shows the effect of N-[2-[2-(4-chlorophenyl)-4-thiazolyl]ethyl]-butanamide application. It is seen that N-[2-[2-(4-chlorophenyl)-4-thiazolyl]ethyl]-butanamide has a potency to cause repigmentation in animal model of vitiligo It is thus established that N-[2-[2-(4-chlorophenyl)-4-thiazolyl]ethyl]-butanamide and pharmaceutically acceptable salts thereof, are safe compounds showing no cytotoxicity.

The active compounds as disclosed in the present invention prevent melanocytes from stress and inflammation—conditions which are seen in the vitiligo patients, hence they can be used to treat vitiligo.

Melanocytes are lost in vitiligo patients whereas their survival is increased by N-[2-[2-(4-chlorophenyl)-4-thiazolyl]ethyl]-butanamide or pharmaceutically acceptable salts thereof under stress condition caused by tunicamycin.

Tyrosinase enzyme activity and melanin levels are reduced in the vitiligo patch of the patients. N-[2-[2-(4-chlorophenyl)-4-thiazolyl]ethyl]-butanamide or pharmaceutically acceptable salts thereof increase tyrosinase enzyme activity and melanin levels and hence can be useful for the vitiligo patients.
Result Analysis
The results as reflected in the experimental data clearly establish that the N-[2-[2-(4-chlorophenyl)-4-thiazolyl] ethyl]-butanamide and pharmaceutically acceptable salts thereof are effective in treatment of pigmentation disorders and skin autoimmune diseases and can be safely used in therapeutic applications directed towards the same.

The present invention also pertains to a formulation comprising N-[2-[2-(4-chlorophenyl)-4-thiazolyl]ethyl]-butanamide for topical application for the treatment of pigmentation disorders and skin autoimmune diseases such as vitiligo.

It is thus conclusively proven that N-[2-[2-(4-chlorophenyl)-4-thiazolyl]ethyl]-butanamide, is a safe compound showing no cytotoxicity.

It prevents melanocytes from stress and inflammation-conditions which are seen in the vitiligo patients, hence it can be used to treat vitiligo.

Melanocytes are lost in vitiligo patients whereas their survival is increased by N-[2-[2-(4-chlorophenyl)-4-thiazolyl]ethyl]-butanamide under stress condition caused by tunicamycin. Tyrosinase enzyme activity and melanin levels are reduced in the vitiligo patch of the patients. N-[2-[2-(4-chlorophenyl)-4-thiazolyl]ethyl]-butanamide increases tyrosinase enzyme activity and melanin levels and hence can be useful for the vitiligo patients.

The present invention clearly brings forth the unexpected utility of N-[2-[2-(4-chlorophenyl)-4-thiazolyl]ethyl]-butanamide for the treatment and stalling of vitiligo, a skin autoimmune disease and a pigmentation disorder. The inventors clearly demonstrate the efficacy of N-[2-[2-(4-chlorophenyl)-4-thiazolyl]ethyl]-butanamide to treat vitiligo and prevent melanocyte cell death.

It is envisaged that the N-[2-[2-(4-chlorophenyl)-4-thiazolyl]ethyl]-butanamide or its formulation alone or in combination with other treatment can be used for the treatment of vitiligo. It may also be utilized for the treatment of diseases including, but not limited to, atopic dermatitis, eczema, psoriasis, alopecia, melasma, pruritus etc.

The invention claimed is:

1. A topical formulation comprising N-[2-[2-(4-chlorophenyl)-4-thiazolyl]ethyl]-butanamide or pharmaceutically acceptable salts thereof as the active compound in an amount of 0.1-90 wt %, a solvent, a gelling agent, a permeation enhancer and an excipient: wherein the topical formulation is in the form of a gel, ointment, cream, lotion, spray or foam.

2. The topical formulation of claim 1, wherein the active compound or pharmaceutically acceptable salts thereof, is present in an amount of 0.1% to 20% by weight.

3. The topical formulation of claim 1, wherein the excipient is selected from a stiffening agent, emulsifying agent, humectant, preservative, antioxidant, chelating agent, and buffer.

4. The topical formulation of claim 1, wherein the solvent is selected from the group consisting of purified water, hexylene glycol, propylene glycol, oleyl alcohol and propylene carbonate.

5. The topical formulation of claim 1, wherein the gelling agent is selected from the group consisting of carbomer, methyl cellulose, sodium carboxyl methyl cellulose, carrageenan, colloidal silicon dioxide, guar gum, hydroxypropyl cellulose, hydroxypropyl methyl cellulose, gelatin, polyethylene oxide, alginic acid and Sodium alginate.

6. The topical formulation of claim 1, wherein the permeation enhancer is selected from the group consisting of propylene glycol, ethanol, isopropyl alcohol, oleic acid and polyethylene glycol.

7. The topical formulation as claimed in claim 1, for use as a medicament for the treatment of skin autoimmune diseases and pigmentation disorders including but not limited to Vitiligo, Psoriasis, Atopic dermatitis and eczema, lichen-planus, Scleroderma, Pemphigus, Bullous, Epidermolysis bullosa, Systemic lupus erythematosus, dermatomyositis, and Alopecia areata.

8. The topical formulation as claimed in claim 7, for use as a medicament for the treatment of vitiligo.

9. A method for the treatment of autoimmune diseases in a mammal diagnosed with the disease, the method comprising administering to the mammal the pharmaceutical formulation of claim 1.

10. The method as claimed in claim 9, wherein the subject is identified as being at risk of developing a skin autoimmune disease selected from the group consisting of vitiligo, psoriasis, atopic dermatitis, eczema, lichen-planus, scleroderma, pemphigus, bullous, epidermolysis bullosa, systemic lupus erythematosus, dermatomyositis, and alopecia areata.

11. The method as claimed in claim 9, wherein the subject has one or more depigmented skin areas, and the compound is applied topically to at least one of the depigmented skin areas.

12. The method for the treatment of autoimmune diseases as claimed in claim 9, wherein the treatment includes prophylactic and therapeutic treatments.

13. The method as claimed in claim 9, wherein the compound is administered either in combination or adjunctively with a second therapeutic treatment or active agent.

14. A method for treating vitiligo in a mammal, comprising administering to the mammal the pharmaceutical formulation of claim 1.

* * * * *